US011416277B2

(12) United States Patent
Saxena et al.

(10) Patent No.: US 11,416,277 B2
(45) Date of Patent: Aug. 16, 2022

(54) SITUATION-AWARE VIRTUAL MACHINE MIGRATION

(71) Applicant: Nutanix, Inc., San Jose, CA (US)

(72) Inventors: Prerna Saxena, Bangalore (IN); Shaju Abraham, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 87 days.

(21) Appl. No.: 16/777,281

(22) Filed: Jan. 30, 2020

(65) Prior Publication Data

US 2021/0157624 A1  May 27, 2021

(30) Foreign Application Priority Data

Nov. 22, 2019 (IN) .............................. 201941047726

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/4557* (2013.01); *G06F 2009/45575* (2013.01); *G06F 2009/45583* (2013.01); *G06F 2009/45595* (2013.01)

(58) Field of Classification Search
CPC .................................................. G06F 9/45558
USPC ........................................................... 718/1
See application file for complete search history.

(56) References Cited

U.S. PATENT DOCUMENTS

| 7,383,405 B2 | 6/2008 | Vega et al. |
| 7,484,208 B1 * | 1/2009 | Nelson ................ G06F 9/45558 |
| | | 718/1 |
| 7,680,919 B2 * | 3/2010 | Nelson .................. H04L 47/783 |
| | | 709/223 |
| 8,458,392 B2 | 6/2013 | Gao et al. |
| 8,549,518 B1 | 10/2013 | Aron et al. |
| 8,601,473 B1 | 12/2013 | Aron et al. |
| 8,661,211 B2 | 2/2014 | Dow |
| 8,850,130 B1 | 9/2014 | Aron et al. |
| 9,201,612 B1 * | 12/2015 | Vincent ............... G06F 9/45558 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Mehran Kamran
(74) *Attorney, Agent, or Firm* — Vista IP Law Group, LLP

(57) ABSTRACT

Methods, systems and computer readable medium for fast cluster upgrades. The disclosed techniques can be applied during an upgrade of a multi-node cluster when upgrading cluster software and/or hardware. Techniques applied include pausing a virtual machine (VM) at a first node, then communicating then-current states of the paused VM to a second node that executes a migrated clone of the paused VM. While the migrated cloned VM is running at the second node, changes to states of the cloned VM are tracked. When the upgrade of the first node has completed, then when migrating the cloned VM back to the first node, only the tracked state changes of the cloned VM are sent from the second node to the first node. The tracked state changes are used to update the states of the paused VM at the first node. The updated VM is resumed at the first node.

24 Claims, 12 Drawing Sheets

(56) References Cited

U.S. PATENT DOCUMENTS

| | | | |
|---|---|---|---|
| 9,354,921 B2* | 5/2016 | Nelson | H04L 47/783 |
| 9,772,866 B1 | 9/2017 | Aron et al. | |
| 10,445,123 B2 | 10/2019 | Deguillard et al. | |
| 2006/0101189 A1* | 5/2006 | Chandrasekaran | G06F 9/4418 711/6 |
| 2009/0113109 A1* | 4/2009 | Nelson | G06F 11/2046 711/6 |
| 2010/0318991 A1* | 12/2010 | Venkitachalam | G06F 9/45533 718/1 |
| 2011/0167195 A1* | 7/2011 | Scales | G06F 11/2038 711/6 |
| 2011/0208908 A1* | 8/2011 | Chou | G06F 11/2038 711/112 |
| 2011/0320556 A1* | 12/2011 | Reuther | G06F 9/4856 709/213 |
| 2013/0060947 A1* | 3/2013 | Nelson | G06F 9/4856 709/226 |
| 2013/0198739 A1* | 8/2013 | Razdan | G06F 9/45558 718/1 |
| 2013/0311992 A1* | 11/2013 | Fuente | G06F 11/1435 718/1 |
| 2015/0074662 A1* | 3/2015 | Saladi | G06F 30/33 718/1 |
| 2015/0127833 A1* | 5/2015 | Hegdal | G06F 9/5016 709/226 |
| 2015/0154081 A1* | 6/2015 | Javadekar | G06F 11/1484 707/639 |
| 2015/0160964 A1* | 6/2015 | Nelson | G06F 9/45558 718/1 |
| 2015/0242232 A1* | 8/2015 | Simoncelli | G06F 9/45558 718/1 |
| 2015/0293756 A1* | 10/2015 | Wright | G06F 21/577 717/178 |
| 2015/0378766 A1* | 12/2015 | Beveridge | G06F 9/45558 718/1 |
| 2016/0154664 A1* | 6/2016 | Iwamatsu | G06F 9/45558 718/1 |
| 2017/0046184 A1* | 2/2017 | Tsirkin | G06F 9/45545 |
| 2018/0083729 A1* | 3/2018 | Wang | G06F 9/45558 |
| 2018/0189087 A1* | 7/2018 | Palermo | H04L 67/142 |
| 2018/0331973 A1* | 11/2018 | Mani | H04L 47/76 |
| 2018/0336106 A1* | 11/2018 | Cao | G06F 11/2038 |
| 2019/0205220 A1* | 7/2019 | Zhang | G06F 11/073 |
| 2020/0310849 A1* | 10/2020 | Laurence | G06F 9/45558 |

OTHER PUBLICATIONS

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from httsp://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 30, 2021), from https://nutanixbible.com/ (Publication date based on indicated capture date by Archive.org; first publication date unknown).

Cano, I. et al., "Curator: Self-Managing Storage for Enterprise Clusters", *14th USENIX Symposium on Networked Systems Design and Implementation, NSDI '17*, (Mar. 27, 2017).

Srivastava, S. et al., "Maintenance for virtual machines in Azure", Microsoft, (May 22, 2020).

Microsoft Azure, "Azure in-place virtual machine migration eliminates reboots during critical security updates", Microsoft Azure, (Jul. 28, 2016).

Google Cloud, "Live migration", Google Cloud, (Last Updated: Jun. 8, 2021).

Cisco, "Upgrade and Migration Guide for Cisco Unified Communications Manager and IM and Presence Service, Release 11.5(1)" Cisco, (Last Updated: Jun. 7, 2021).

Veeam, "Script to create active full backups on Veeam Availablity for Nutanix AHV 1.0", (Dec. 27, 2019).

"HC3 User Guide: HyperCore v6.4.2," ScaleComputing, date found via Google as May 2015.

* cited by examiner

SITUATION-AWARE VIRTUAL MACHINE MIGRATION

CROSS REFERENCE TO RELATED APPLICATION(S)

This application claims the benefit of priority to Indian Patent Application No. 201941047726, titled "SITUATION-AWARE VIRTUAL MACHINE MIGRATION", filed on Nov. 22, 2019, which is hereby incorporated by reference in its entirety.

FIELD

This disclosure relates to virtualized systems, and more particularly to techniques for situation-aware virtual machine migration.

BACKGROUND

In a multi-node cluster, the hypervisor or other critical application upgrade involves live migration of all running instances of virtual machines from the source node to the destination node. This consumes a considerable amount of time and network bandwidth. Once the upgrade has completed (which might involve a reboot of the source node), the VMs are brought back to the original node. This operation also consumes network bandwidth affecting performance of other VMs and a considerable amount of time is often needed to transfer data between the destination and source nodes. In a typical rolling upgrade in a multi-node cluster, most of this time is taken by the movement of VMs back and forth between nodes. This movement of VMs back and forth between nodes often causes long overall upgrade window time frames.

Therefore, what is needed is a technique or techniques for more quickly performing upgrades of nodes in virtualized systems.

SUMMARY

The present disclosure describes techniques used in systems, methods, and in computer program products for situation-aware virtual machine migration, which techniques advance the relevant technologies to address technological issues with legacy approaches. More specifically, the present disclosure describes techniques used in systems, methods, and in computer program products for situation-aware virtual machine migration. Certain embodiments are directed to technological solutions for recognizing when a particular upgrade of a node does not require a reboot of that node such that the memory of the upgraded node can be advantageously managed during an upgrade cycle.

The ordered combination of steps of the embodiments serve in the context of practical applications that perform steps for recognizing when an upgrade of a particular node does not require a reboot of that particular node such that the memory of the upgraded node can be advantageously managed during the upgrade cycle. As such, techniques for recognizing when a particular upgrade of a node does not require a reboot serves to overcome long standing yet heretofore unsolved technological problems associated with upgrades of nodes in virtualized clusters.

The disclosed embodiments are technological solutions pertaining to technological problems that arise in the hardware and software arts that underlie virtualization systems. Aspects of the present disclosure achieve performance and other improvements in peripheral technical fields as well, including, but not limited to the field of hyperconverged computing platform management.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
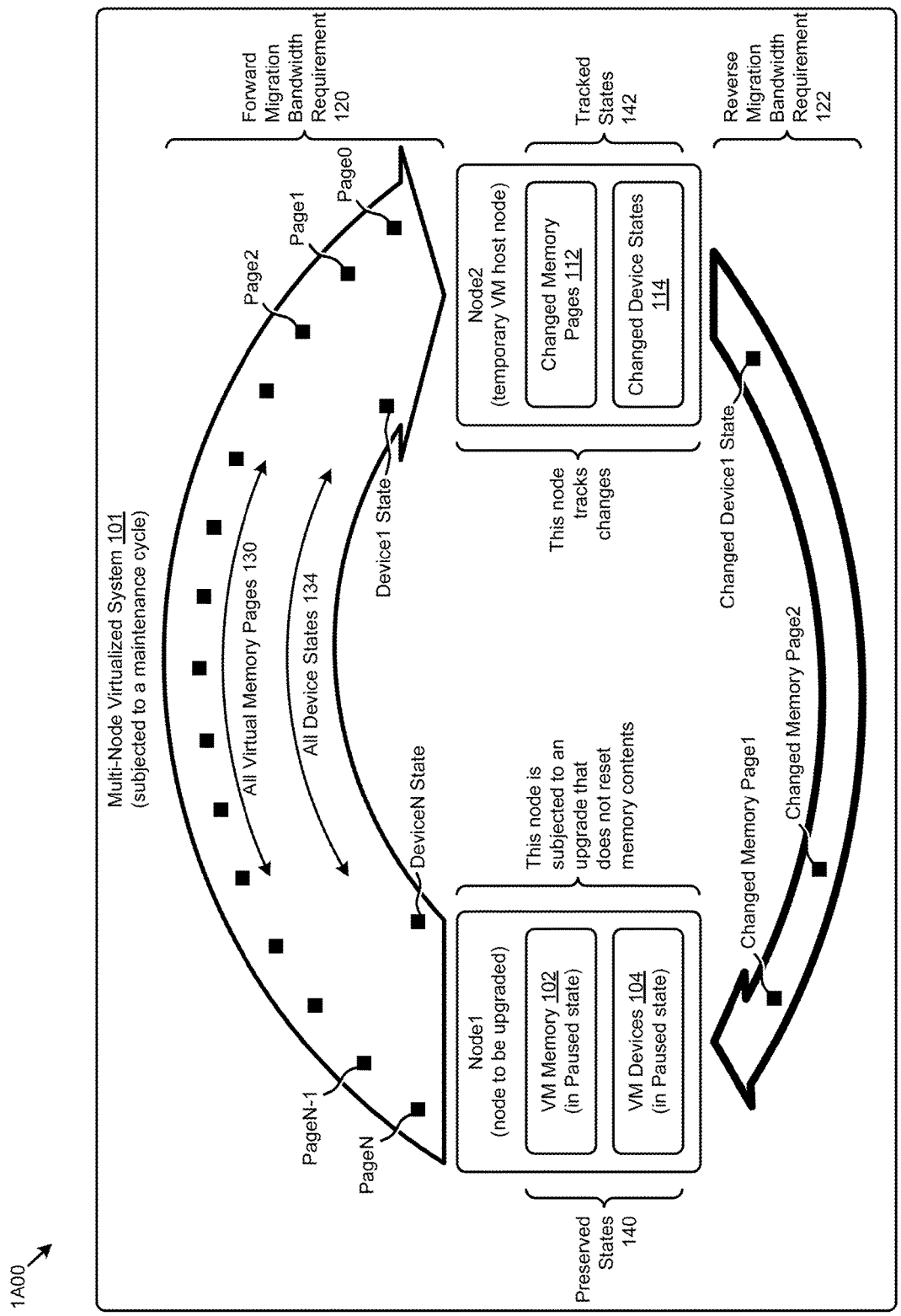
FIG. 1A depicts an environment in which a high-performance, situation-aware virtual machine migration can take place, according to one embodiment.

Aspects of the present disclosure solve problems associated with performing upgrades of nodes in virtualized systems. Specifically, such upgrades often require significant computing resources, and in some cases such upgrades take a long time to migrate virtual machines. These problems are unique to, and may have been created by, various computer-implemented methods for performing upgrades of nodes in virtualized systems. To overcome these problems, various embodiments recognize when a particular upgrade of a node does not require a reboot of that node such that the memory of the upgraded node can be advantageously managed during an upgrade cycle, and thereby avoid unnecessary copying of virtual machine memory images. The accompanying figures and discussions herein present example environments, systems, methods, and computer program products for situation-aware virtual machine migration.

Overview

The time taken for migrating the virtual machines (VMs) from a destination node back to its source node can be significantly reduced if the entire migration process is aware of the fact that the migrated VM will stay in the destination node only for a short duration of time, usually only for the time taken for upgrading the source node. Once the source node is upgraded, the VMs need to be migrated back to the source node, which involves copying the VM data from the destination node back to the source node. The disclosed embodiments reduce the amount of data transferred from the destination node of a VM back to the source node of the VM.

Example Multi-Phase Approach

Phase 1: Determine if the upgrade of the node requires a reboot of the node. If not, then continue to Phase 2.

Phase 2: Initiate forward migration of the VMs on the node to be upgraded. In example cases the migration of a particular VMs is a "live" migration such that a particular VM to be migrated runs at the source node until most of the image of the to-be-migrated VM has been transferred to the destination node. When most of the image of the to-be-migrated VM has been transferred to the destination node, then pause the VM at the source node, complete the transfer of the remaining portions of the image of the to-be-migrated VM from the source node to the destination node, then pausing the VM at the source node, and starting the forward migrated VM at destination node.

After the forward migration has completed, the paused VMs are maintained on the source node in a dormant state. Maintenance of this dormant state involves not freeing up the memory or otherwise modifying the memory used by the VMs, at least until a reverse migration is commenced. Although the VMs are paused on the source node they can be resumed later, for example upon commencement of a reverse migration process. The upgrade operation is performed on the source node while the unmodified memory state of the paused VMs is maintained in the physical memory of the source node.

Phase 3: Track VM changes on the destination node. Indicate to the destination node that the VMs are temporarily running in the destination node so as to accomplish an upgrade of the source node. Responsive to the indication that the VMs are temporarily running in the destination node so as to accomplish an upgrade, and while running the VMs at the destination node, the changed memory pages are noted. Any changes made to any VMs memory is noted (e.g., the changed pages are marked as "dirty"). The virtual machines continue to run as normal, and separate metadata is maintained to record the existence and identification of changed memory pages and/or changed device states. In some cases, only a few memory pages and/or device states are modified during the VMs' temporary tenure on the destination node.

Phase 4: Perform reverse migration of the VMs using the tracked changes. Once the upgrade operation has completed on the source node, the VMs are migrated back to the source node. This is efficient since (1) in a rolling upgrade scenario, the next node that undergoes the upgrade could be the current destination node, and (2) since the memory state of the VM has been maintained at the source node. To reverse migrate a subject VM in this upgrade-aware scenario, only the changes of the memory contents and device state of the subject VM that had been changed are then transferred back. Once the changed memory contents and device states have been communicated back to the source node, the source node can update the memory pages corresponding to the paused subject VM and then resume (e.g., un-paused) the subject VM. The destination node can then free up the resources that were temporarily occupied by the VM. This can be repeated for each VM that had been paused at the source node.

Controller Virtual Machine Upgrade Scenario

Many virtualized systems include a controller virtual machine (CVM). A CVM upgrade often involves putting the node in maintenance mode, which means that all VMs are migrated to another node and then brought back once the upgrade has completed. Performing all or some of the foregoing steps for situation-aware virtual machine migration can reduce the overall upgrade time.

Kernel Upgrade Scenario

Many operating systems can be upgraded (e.g., versioned) without requiring a reboot of the host system. For example, a Linux kernel can undergo an upgrade through kexec such that the upgrade does not involve a reset of the DRAM contents. In some such upgrade scenarios, certain user space applications running at the time of kexec are killed even though the upgrade does not involve destruction of the DRAM contents. In some such situations, memory markers are stored in a location that facilitates maintenance of the memory state even though one or more user space processes are killed during performance of the kexec.

Performing all or some of the foregoing steps for situation-aware virtual machine migration can reduce the overall upgrade time.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A depicts an environment 1A00 in which a high-performance, situation-aware virtual machine migration can take place. The figure is being presented to highlight the difference between bandwidth requirements for forward migration of a virtual machine as compared to bandwidth requirements for a reverse migration of the same virtual machine. As shown by the open arrows, the reverse migration bandwidth requirement 122 is significantly less than the forward migration bandwidth requirement 120. This is because, in accordance with practice of the herein-disclosed situation-aware virtual machine migration, only small amounts of data (e.g., the shown changed memory pages and/or the shown device states) need to be reverse migrated.

The figure depicts a multi-node virtualized system 101 that is to be subjected to a maintenance cycle. As shown, in the forward migration path from a source node (e.g., Node1) to a destination node (e.g., Node2), all virtual memory pages 130 (e.g., page0, page1, page2, . . . , pageN−1, pageN) and all device states 134 (e.g., device1 state, . . . , deviceN state) are communicated from the source node to the destination node whereas, in the reverse migration direction, only changes (e.g., changed memory page1, changed memory page2, changed device1 state) are communicated back to the source node from the destination node.

However, significant performance gains can be achieved when the herein-disclosed techniques are practiced during a cluster upgrade. Specifically, and with respect to bandwidth required, the bandwidth demands can be cut in half. This in turn can cut the elapsed time to complete a cluster upgrade nearly in half.

In this and other embodiments, operations are performed to maintain instances of preserved states 140 at a source node (e.g., Node1) and to capture instances of tracked states 142 at a destination node (e.g., Node2). More specifically, and as shown, (1) the aforementioned instances of preserved states derive from Node1's VM memory 102 and from Node1's VM devices 104 when the VM is in a paused state, and (2) the aforementioned instances of tracked states derive from Node2's changed memory pages 112 and from Node2's changed device states 114, which changes happen when the migrated VM is running at Node2.

Since the VM memory and the VM devices are preserved at Node1 while the migrated VM is running at Node2, then to reestablish the VM to be running on Node1, only the contents of changed memory pages and the changed device states need to be applied to the preserved VM memory and the preserved VM devices. Once applied, the VM can be reestablished to be running on Node1. The reestablished VM now running on Node1 will have the same state as the VM had when the VM was running on Node2.

To accomplish this sort of forward migration of a VM, followed by an upgrade of the source node, and then reverse migration of the VM from the destination node back to the newly-upgraded source node, the memory contents of the VM at the source node needs to be preserved. One way to preserve the contents of the virtual memory of a virtual machine at a particular moment in time (e.g., when a node upgrade is to be performed) is to merely pause the VM and leave that VM's memory intact. Pausing the VM and leaving the VM's memory intact works when the memory does not undergo a power cycle, such as when a node is subjected to a reboot.

The environment and components of FIG. 1A support many rolling upgrade scenarios. One such upgrade scenario is shown and described as pertains to FIG. 1B.

Figure 1B:
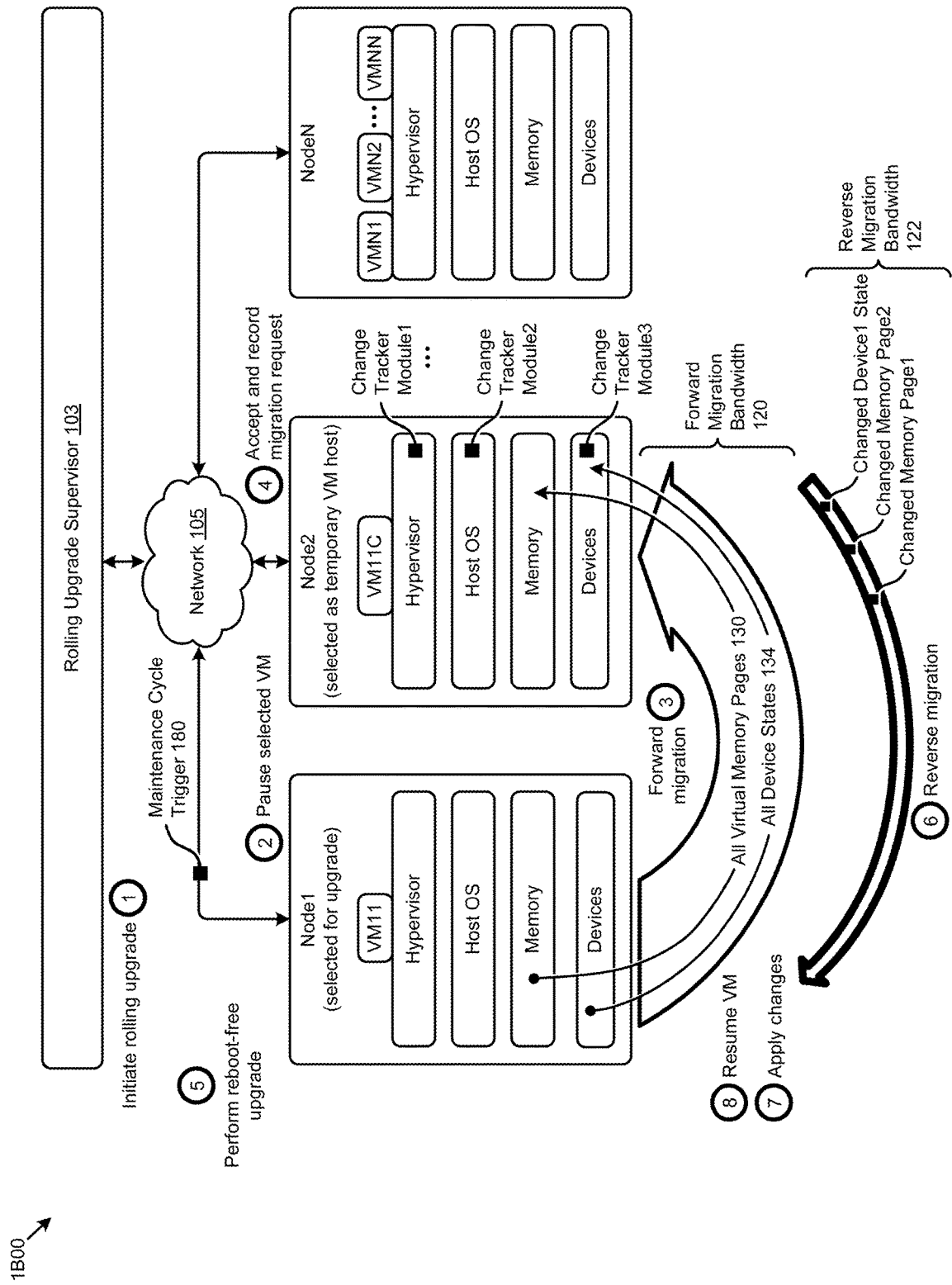
FIG. 1B depicts a series of operations that are performed in accordance with an upgrade scenario in which a reboot-free maintenance cycle is performed on a computing node, according to one embodiment.

FIG. 1B depicts a series of operations that are performed in accordance with an upgrade scenario 1B00 in which a reboot-free maintenance cycle is performed on a computing node. As an option, one or more variations of upgrade scenario 1B00 or any aspect thereof may be implemented in the context of the architecture and functionality of the embodiments described herein. The upgrade scenario 1B00 can be implemented in any environment.

FIG. 1B is being presented to highlight the operations that are performed in representative scenarios. The shown system includes a rolling upgrade supervisor 103, a network 105, and several computing nodes (e.g., Node1, Node2, . . . , NodeN). When the rolling upgrade supervisor initiates a rolling upgrade (operation 1) a node is selected to be the subject of the upgrade. A signal (e.g., maintenance cycle trigger 180) is sent to the subject node (i.e., shown in this example as Node1). The subject node will then initiate activities to live migrate a selected VM (e.g., VM11) running on the subject node (operation 2). Once the selected VM has been subjected to live migration, the VM can be paused or suspended (operation 3). In this forward migration operation, all virtual memory pages 130 and all device states 134 are communicated from the source node to the destination node. The destination node is configured to accept the migration as a temporary location for the VM (e.g., VM11C on Node2) while the source node undergoes an upgrade. Furthermore, the destination node is configured such that changes to pages of virtual memory of the migrated VM (e.g., VM11C) are recorded (operation 4). The pages that are written to during the execution of the migrated VM at the destination node are noted (e.g., as "dirty" pages). Also, device states that are changed during the execution of the migrated VM at the destination node are noted. Recognition of a changed memory page, and/or a device state change can be facilitated by one or more change tracker modules (e.g., change tracker module1, change tracker module2, change tracker module3). Such change trackers, or portions thereof can be situated anywhere within the cluster, however in the embodiment shown, the change trackers are situated at the destination node, specifically, in the hypervisor (e.g., change tracker module1), and in the host OS (e.g., change tracker module2), and device itself (e.g., change tracker module3). Further details pertaining to change trackers are shown and described as pertains to FIG. 6.

When the upgrade of the source node (e.g., Node1) has completed—without a reboot or other destruction of the memory of the source node (operation 5)—then a reverse migration can commence (operation 6). The shown reverse migration includes sending only changes from the destination node to the source node. Such changes are applied at the source node (operation 7), after which operation of the VM of the source node that had been previously been paused can now be resumed (operation 8).

Since only changes to the virtual memory of the VM that had been forward migrated to the destination node (e.g., VM11C) need be sent back to the source node, resumption of the VM at the source node (e.g., VM11) after the upgrade can be quickly accomplished. For example, if VM11 had allocated 16 GB of memory, but then, if during execution of VM11C at the destination node, only 2 MB of the allocated 16 GB of memory were modified, then only the pages of memory corresponding to the 2 MB of changed memory need be communicated from the destination node to the source node.

The foregoing scenario describes merely one example scenario, specifically the scenario where merely one VM (e.g., VM11) is migrated while the source node undergoes a reboot-free upgrade. However, there are many circumstances where multiple VMs can be migrated back and forth between nodes during the reboot-free upgrade. Strictly as an alternative example scenario, in a node that is configured as a non-paging node (e.g., NodeN), multiple VMs (e.g., VMN1, VMN2, . . . , VMNN) can run on the same node. Each of the multiple VMs allocate their own virtual memory space which corresponds to non-overlapping segments of real physical memory. In such a scenario, the state of virtual memory of multiple VMs can be preserved for a time merely by pausing the VMs and then by not destroying the contents of the real physical memory (e.g., as a consequence of a reboot cycle).

Situation-aware processing techniques, specifically techniques for determining whether or not a particular maintenance cycle requires a reboot (thus destroying the contents of the real physical memory) are presented infra.

Figure 2A:
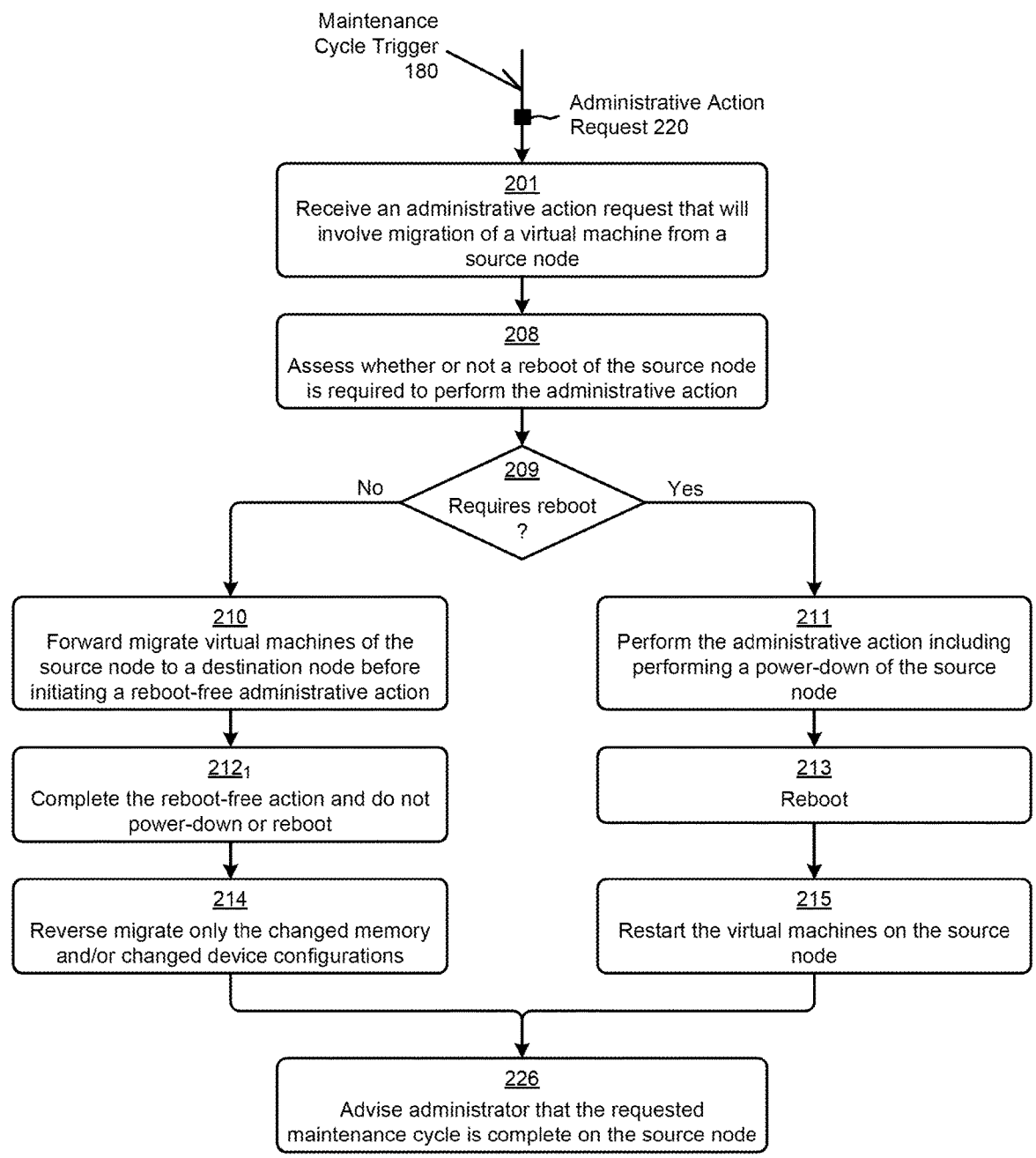
FIG. 2A presents a situation-aware processing technique as used to implement situation-aware virtual machine migration in response to receipt of an administrative action request, according to one embodiment.

FIG. 2A presents a situation-aware processing technique 2A00 as used to implement situation-aware virtual machine migration in response to receipt of an administrative action request. As an option, one or more variations of situation-aware processing technique 2A00 or any aspect thereof may be implemented in the context of the architecture and functionality of the embodiments described herein. The situation-aware processing technique 2A00 or any aspect thereof may be implemented in any environment.

FIG. 2A illustrates aspects pertaining to recognizing when a particular upgrade of a node does not require a reboot of that node such that the memory of the upgraded node can be advantageously managed during the upgrade cycle. The shown flow is triggered by a maintenance cycle trigger 180, and processing begins at step 201. Step 201 is entered upon receipt of an administrative action request 220 that will involve migration of a virtual machine from a source node. The administrative action might pertain to an upgrade or other change to some aspect of the source node (e.g., a hardware upgrade, a software change, other maintenance cycle, etc.). As one example, the source node might need to enter a maintenance mode to accommodate the hardware upgrade and/or the software change, and/or for performance of the maintenance cycle. Operations to determine characteristics of the administrative action request are performed. Next, step 208 considers those characteristics of the administrative action to determine whether or not a reboot (or other action that destroys the node's memory contents) is required in order to carry out the requested administrative action. As an example, upgrading a Linux kernel through kexec kills all user space applications running at the time of the kexec. Accordingly, performing a kexec may be classified to be an upgrade that requires a reboot. As another example, upgrading a user space hypervisor component such as qemu might destroy memory contents. As such, upgrading a user space hypervisor component may be classified to be an upgrade that requires a reboot.

Furthermore, if it is determined that performing the requested administrative action would be classified to involve a power-down of the node (e.g., if a new motherboard and power supply were to be installed in the node), then a reboot might be deemed as required. In other cases, performing a requested administrative action might not require a reboot of that node. For example, a node running a Linux operating system can be upgraded with new operating system code modules without requiring a reboot. As another example, firmware for a device can be updated into the code base for the device, which updated firmware will be applied to the device itself upon a subsequent reboot. As such, the update to the firmware can be carried out as a reboot-free action. The reboot to actually apply the updated firmware to the device can be deferred. Still further actions can be classified as requiring a reboot or not. In some cases, non-critical user space utilities such as iputils or tar can be upgraded without a reboot. In contrast, upgrading the microcode of the processor or processors of the node would be deemed to require a reboot.

As described above, there are many scenarios where a reboot is not needed in order to initiate and complete a requested administrative action. This is shown at decision 209, where in the case of one set of conditions, the "No" branch of decision 209 is taken and any number of reboot-free administrative actions can be accomplished. Alternatively, in the case of a different set of conditions, the "Yes" branch of decision 209 might be taken, and the techniques that involve a reboot of the to-be-upgraded node are applied.

As shown, when the "No" branch of decision 209 is taken, step 210 serves to forward migrate the virtual machines of the source node to a destination node. This forward migration involves suspending a VM on the source node and forwarding the VM, including its memory contents and/or device configuration, to a selected destination node. Since the node to be upgraded will not undergo a reboot or other event that destroys the contents of the memory at the source node, the contents of the memory of the source node can be preserved during the course of carrying out the reboot-free administrative action. Specifically, and as shown, step $212_1$ includes completion of the reboot-free action without any power-down or reboot of the source node. Then, at step 214, after completion of the reboot-free action without any power-down or reboot of the source node, the source node can accept the contents of the changed memory pages and/or any device configurations that might have been changed at the destination node. The VM at the source node that was suspended during the course of performing the reboot-free action can then be resumed. Once performance of the reboot-free action has completed, the administrator can be so advised (step 226).

The operations that are performed in response to taking the "No" branch of decision 209 (e.g., step 210, step $212_1$, and step 214) are distinguished from operations that are performed in response to taking the "Yes" branch of decision 209 (e.g., step 211, step 213, and step 215). Specifically, and as shown, step 211 powers down the source node so as to accomplish the administrative action. This involves a reboot (step 213), which destroys the contents of the memory. As a consequence, the virtual machines of the source node are restarted rather than resumed (step 215). In some cases, a service level agreement (SLA) might be in place that demands extremely high availability of the virtual machines, thus forcing the forward and reverse migration to be carried out. In other situations, however, it might be more efficient to hibernate the VMs without migration and restart these VMs after performing the administrative actions that demand a reboot or power-down. A score pertaining to the efficacy of migrating VMs (without an interruption of service) versus restarting (even with some interruption of service) can be calculated.

In some cases, the administrative action request includes several different actions, some of which might require a reboot, and some of which might not require a reboot. In such cases, the nature of the actions can be considered so as to generate a schedule for performing the actions. More specifically, a determination can be made to defer some of the actions. Various conditions that influence the determination to defer actions are shown and discussed as pertains to FIG. 2B.

Figure 2B:
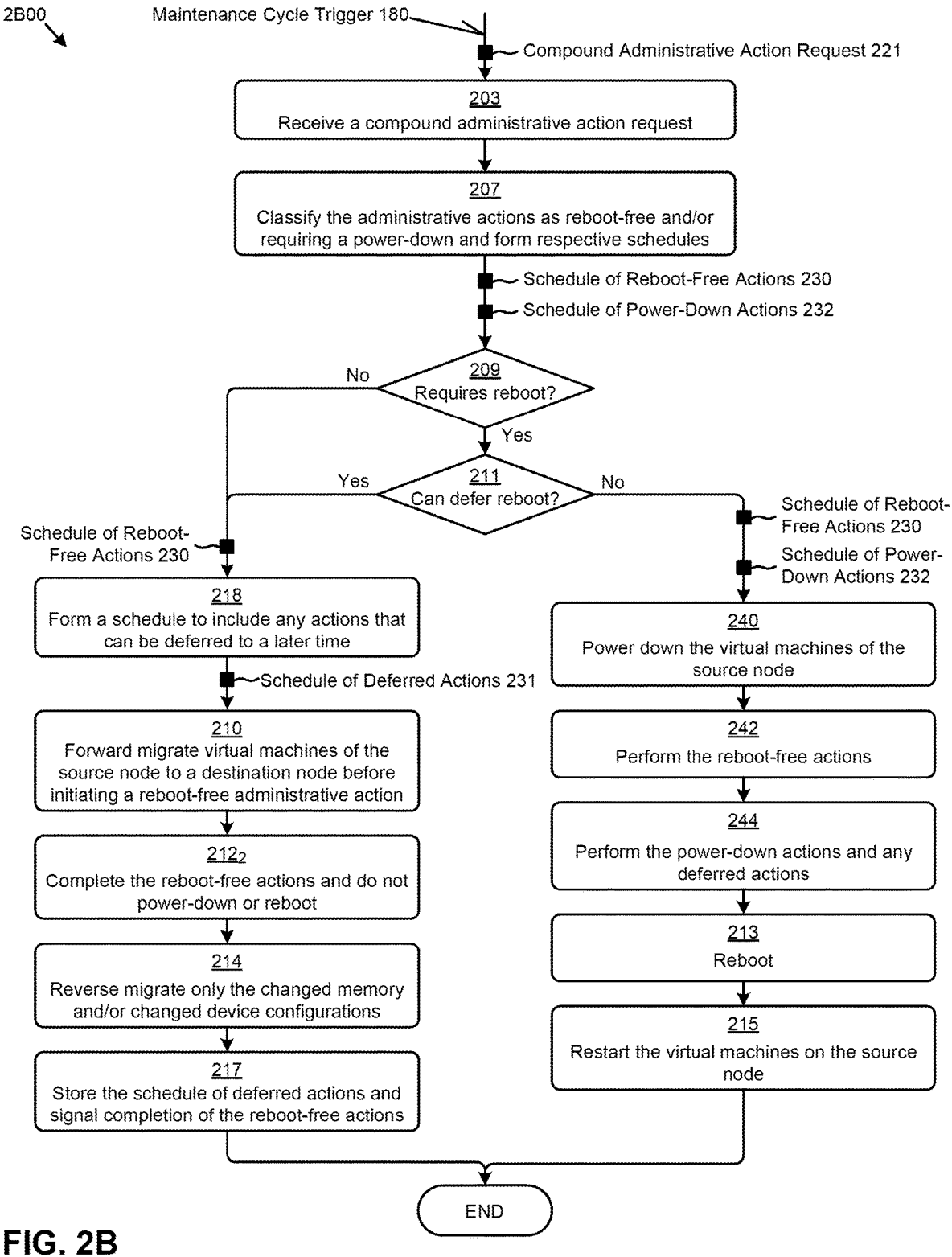
FIG. 2B presents an alternative situation-aware processing technique as used to implement situation-aware virtual machine migration in response to receipt of a compound administrative action request, according to one embodiment.

FIG. 2B presents an alternative situation-aware processing technique 2B00 as used to implement situation-aware virtual machine migration in response to receipt of a compound administrative action request. A compound administrative action request is one that includes multiple actions. In some cases, a compound administrative action request might include two or more action requests, neither of which require a reboot. In other cases, a compound administrative action request might include two or more action requests, one or more of which do not require a reboot, and one or more of which do require a reboot. The situation-aware processing technique 2B00 of FIG. 2B is being presented to show how a compound administrative action request can be processed within the context of the present disclosure.

The shown flow is triggered by a maintenance cycle trigger 180, and processing of the situation-aware processing technique begins at step 203. Specifically, at step 203 a compound administrative request 221 is received. Operation of step 207 classifies a particular administrative action as either (1) an administrative action that requires a reboot or power-down of the subject node, or (2) an administrative action that is deemed to be a reboot-free action. Operation of step 207 further results in two schedules: specifically, (1) a schedule of reboot-free actions 230, and (2) a schedule of power-down actions 232 that would require a power-down to carry-out. These two schedules of actions can be carried out separately, either in sequence, or they can be interleaved, or in some cases these two schedules of actions can be carried out in parallel. In some cases, an administrative action can be classified into two or more individually-schedulable actions. For example, a firmware upgrade might need a reboot in order to be completely accomplished, however the firmware code base might be upgraded in a first activity, and a later reboot can be performed in later activity. In some cases, a reboot of the node might be already schedule as a result of some other administrative action. As such, a first portion of an administrative action can be classified and carried out as a reboot-free action while a second portion can be deferred to a later moment in time.

As previously stated, a compound administrative action request might include two or more action requests, one or more of which do not require a reboot, and one or more of which do require a reboot. The shown flow includes (1) a first decision 209 as to whether or not a reboot is required in order to carry out the compound administrative request and, if so, (2) a second decision 211 as to whether a reboot can be deferred. This latter case can happen when an administrative action would require a reboot but is deemed to be a non-critical action such as a non-critical patch to software that can be performed at a later time (e.g., without violating any in-force SLA).

In the case that decision 209 takes the "No" branch, then no reboot is needed to accomplish the compound administrative action and activities to act on the schedule of reboot-free actions 230 can be initiated at any time. However, it can happen that even though there are some administrative actions included in the compound administrative action request that would require a reboot, it might be the case that the corresponding reboot can be performed at a later moment in time. In such cases, decision 209 takes the "Yes" branch and decision 211 is entered. Decision 211 serves to classify whether or not an administrative action that has been determined to require a reboot is an administrative action that can be deferred (e.g., to be performed at a later moment). If so, decision 211 takes the "Yes" branch and step 218 commences. Step 218 processes the compound administrative action request to identify the administrative actions that can be deferred and a schedule of deferred actions 231 is formed. The schedule of deferred actions can be stored for later processing (e.g., by step 244). When step 218 completes, processing moves to step 210 to forward migrate the virtual machines, step 2122 to complete the reboot-free actions, and step 214 to reverse migrate only the changed memory pages and/or device configurations. Step 217 serves to signal completion of the reboot-free actions, at which point the schedule of deferred actions 231 is stored for later retrieval (e.g., by step 242 or step 244).

As earlier indicated, decision 211 serves to classify whether or not an administrative action that has been determined to require a reboot is an administrative action that can be deferred. If not, then the "No" branch of decision 211 is taken and step 240, step 242, and step 244 are carried out to power down the virtual machines of the source node, perform any reboot-free actions, perform any deferred actions, and perform the power-down actions. Once the reboot-free actions, any deferred actions, and any actions that require a power-down have completed, the node can be rebooted (step 213). When the node comes back up from the reboot, the virtual machines on the source node can be restarted.

The foregoing discussion of FIG. 2A and FIG. 2B includes inter-node cooperation for carrying out a specialized forward migration (step 210) and inter-node cooperation for carrying out a specialized reverse migration between the two nodes (step 214), which inter-node cooperation is disclosed in further detail as follows.

Figure 3:
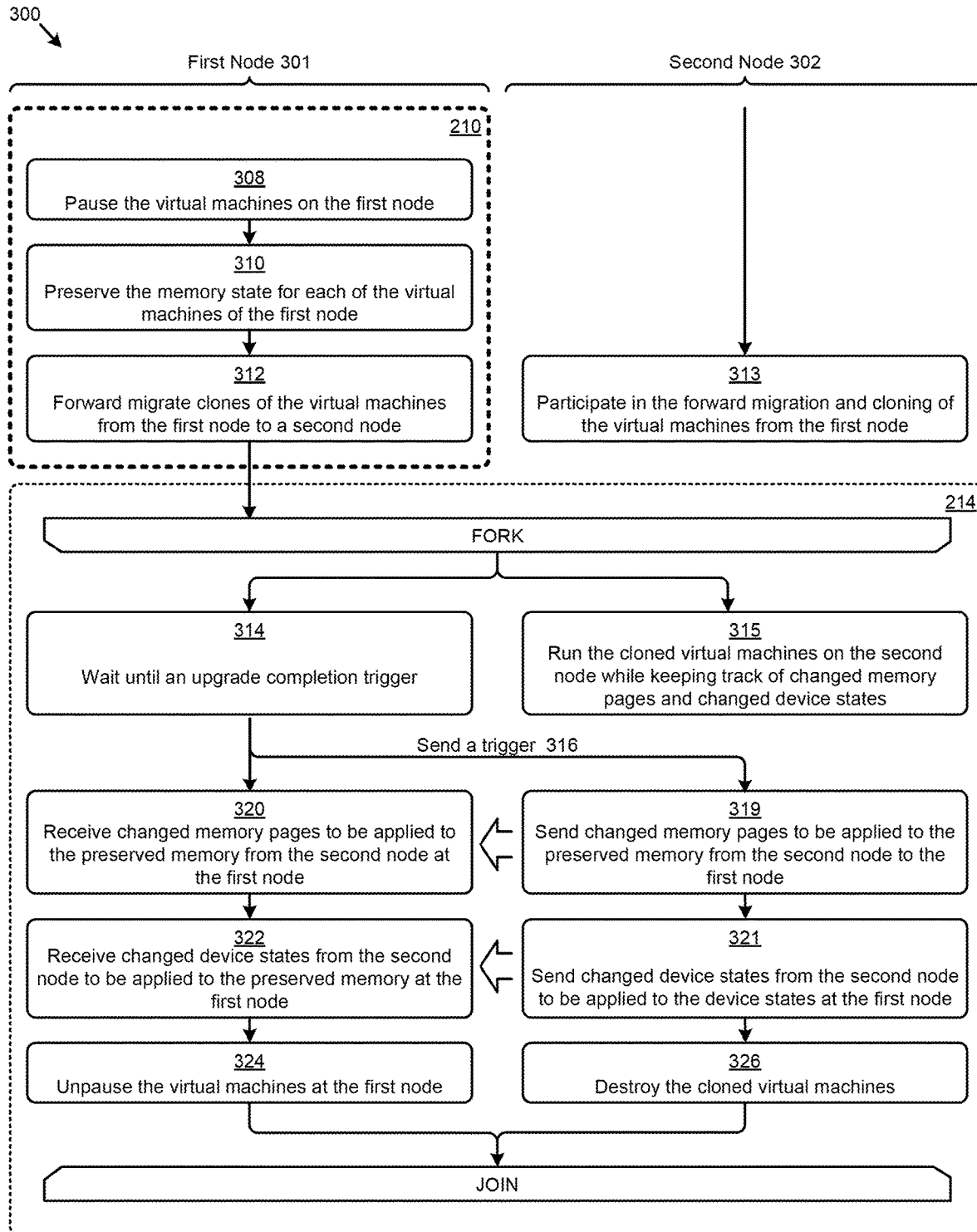
FIG. 3 is a diagram presenting examples of inter-node cooperation according to which a high-performance, situation-aware virtual machine migration can take place, according to one embodiment.

FIG. 3 is a diagram presenting examples of inter-node cooperation 300 according to which a high-performance, situation-aware virtual machine migration can take place. As an option, one or more variations of inter-node cooperation 300 or any aspect thereof may be implemented in the context of the architecture and functionality of the embodiments described herein. The inter-node cooperation 300 or any aspect thereof may be implemented in any environment.

FIG. 3 illustrates aspects pertaining to advantageously managing memory during an upgrade cycle. Specifically, the figure is being presented to address the problems that arise in virtualized systems during an upgrade cycle. Specifically, upgrades of nodes of a virtualized system often take a long time and large amounts of computing resources to migrate virtual machines from a first node to a second node and back. The shown inter-node cooperation 300 serves to significantly reduce the amount of inter-node communication needed to take place when performing such rolling upgrades.

Referring again to FIG. 2A, at or about the time that the "No" branch of decision 209 is taken, the virtual machines of the source node of FIG. 3 (e.g., the shown first node 301) are suspended (step 308). The memory state for each of the suspended VMs is preserved (step 310). Merely as one example, the virtual memory that is the memory footprint of a particular VM is merely retained in the state that was present at the time of suspension. Since the VM is only suspended and not destroyed, the memory image of the VM remains intact. At step 312, the suspended virtual machines are forward migrated to the destination node (e.g., the shown second node 302). The destination node participates in the forward migration and cloning of the subject VM or VMs (step 313). The forward migration might include sending an indication (e.g., a message or other signal), which serves to advise the destination node that changes to the memory images that might occur during running of the migrated VM are to be recorded. Specifically, any changes made by the migrated VM to its memory image is to be noted (e.g., by keeping track of which pages are changed). Changes made by the migrated VM to its memory image can be noted using any known techniques. Additionally or alternatively, a bitmap can be allocated with enough bits to represent every page of the VM. Whenever the corresponding page is modified, the corresponding bit is set. Additionally or alternatively, the pages of the VM at the destination node can be marked as READONLY such that each write to a READONLY page generates an exception. The hypervisor can catch the exception and set the corresponding bit in the bitmap.

During forward migration of a VM or VMs from the source node to the destination node, the two nodes cooperate. Specifically, a set of operations to be carried out on the source node are carried out in parallel with a set of operations to be carried out by the destination node. As shown, the destination node waits (at step 315) runs the VMs while keeping track of changed pages and/or other changed configurations (e.g., device configurations). Meanwhile, the source node waits (at step 314) for a trigger (e.g., from the rolling upgrade supervisor) to indicate that the upgrade has completed. When the upgrade has completed, the source node can relay the trigger 316 to the destination node, at which time the destination node can initiate reverse migration (e.g., reverse live migration) of the running virtual machines (not shown) and then proceed to send the contents of only the changed memory pages (step 319) to the source node. The contents of only the changed memory pages are then received (at step 320) the source node and applied to the preserved memory of the corresponding VM. In some cases, device states might have changed at the destination node as a consequence of running the VMs at the destination node. As such, the destination node can send the device status changes (step 321) to the source node, which device status changes are received (at step 322) and applied to the preserved memory of the corresponding VM. Once the changed memory pages and the device status changes have been sent to the source node, the cloned virtual machines at the destination node can be destroyed (step 326).

The source node unsuspends (i.e., resumes) the execution of the virtual machines (step 324) at the source node, thus completing the upgrade to the source node and resuming running of the VMs at the source node, proceeding from the execution point left off at the time the VM was suspended at the destination node.

The foregoing discussion of FIG. 3 includes a discussion of techniques for handling of changed memory pages and techniques for handling changed device states, which techniques are disclosed in further detail as follows.

Figure 4:
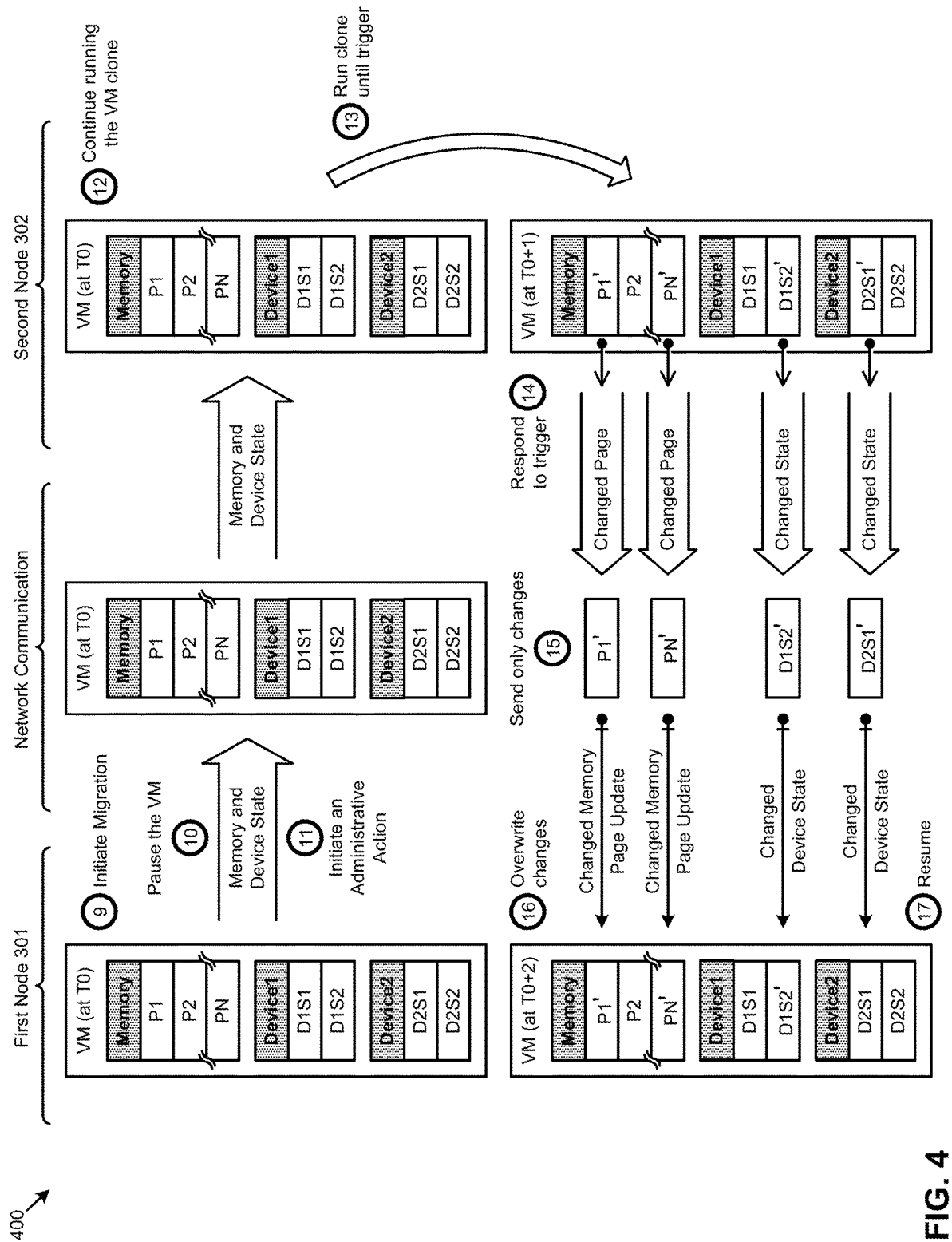
FIG. 4 is a diagram presenting examples of inter-node communications according to which a high-performance, situation-aware virtual machine migration can take place, according to one embodiment.

FIG. 4 is a diagram presenting examples of inter-node communications 400 according to which a high-performance, situation-aware virtual machine migration can take place. As an option, one or more variations of inter-node communications 400 or any aspect thereof may be implemented in the context of the architecture and functionality of the embodiments described herein. The inter-node communications 400 or any aspect thereof may be implemented in any environment.

FIG. 4 illustrates how a memory image of a VM and that VM's device state are communicated from a first node to a second node. FIG. 4 also shows how only changes pages of a VM and that VM's changed device states are communicated from a first node to a second node. The figure further depicts a series of operations by and between a first node and a second node so as to implement high-performance rolling upgrades of a multi-node cluster.

The figure depicts changing the configuration of a virtual machine as it undergoes migration from a source node (e.g., the shown first node 301) to a destination node (e.g., the shown second node 302), and then back to the source node. Specifically, at a first moment in time, the shown virtual machine (i.e., VM (at T0)) is subjected to live migration steps (operation 9). At some point during the migration, the VM is paused (operation 10). The aforementioned live migration steps serve to communicate the VM's memory state and device states to a destination node. Such VM's memory state and device states are stored at the destination node so as to create a runnable clone of the VM at the destination node. The cloned VM is unsuspended and continues to run at the destination node (operation 12). The cloned VM runs until receipt of a trigger (operation 13). The trigger indicates that the source node has completed its administrative action.

FIG. 4 also depicts that the source node is subjected to an administrative action (at operation 11). So long as the source node is in the process of performing the administrative action, the cloned VM runs, possibly changing it memory pages, and possibly changing its device configurations and/or device states. At some point in time (e.g., time T0+1) one or more processes at the destination node respond to the aforementioned trigger (operation 14) at which time only the changed memory pages and/or changed device states are sent to the source node (operation 15). One or more processes at the source node receive the memory page changes (e.g., P1', PN') and receive the device state changes (e.g., D1S2' and D2S1'). The changes are used to overwrite the preserved memory image (operation 16) of the VM at the source node. Once the changes have been applied at the source node, the VM can resume (operation 17).

The foregoing non-limiting example is merely for illustration. In many cases, some memory page changes are sent back to the source node without sending any device changes, while in other cases (e.g., when there are no memory page changes) only the device changes are sent back to the source node. The memory page changes (if any) and the device configuration changes (if any) can be sent to back to the source node in any order and in any combination. In still other cases, the entire device state is sent back to the source node rather than sending only device state changes that may have been made by the cloned VM.

Figure 5:
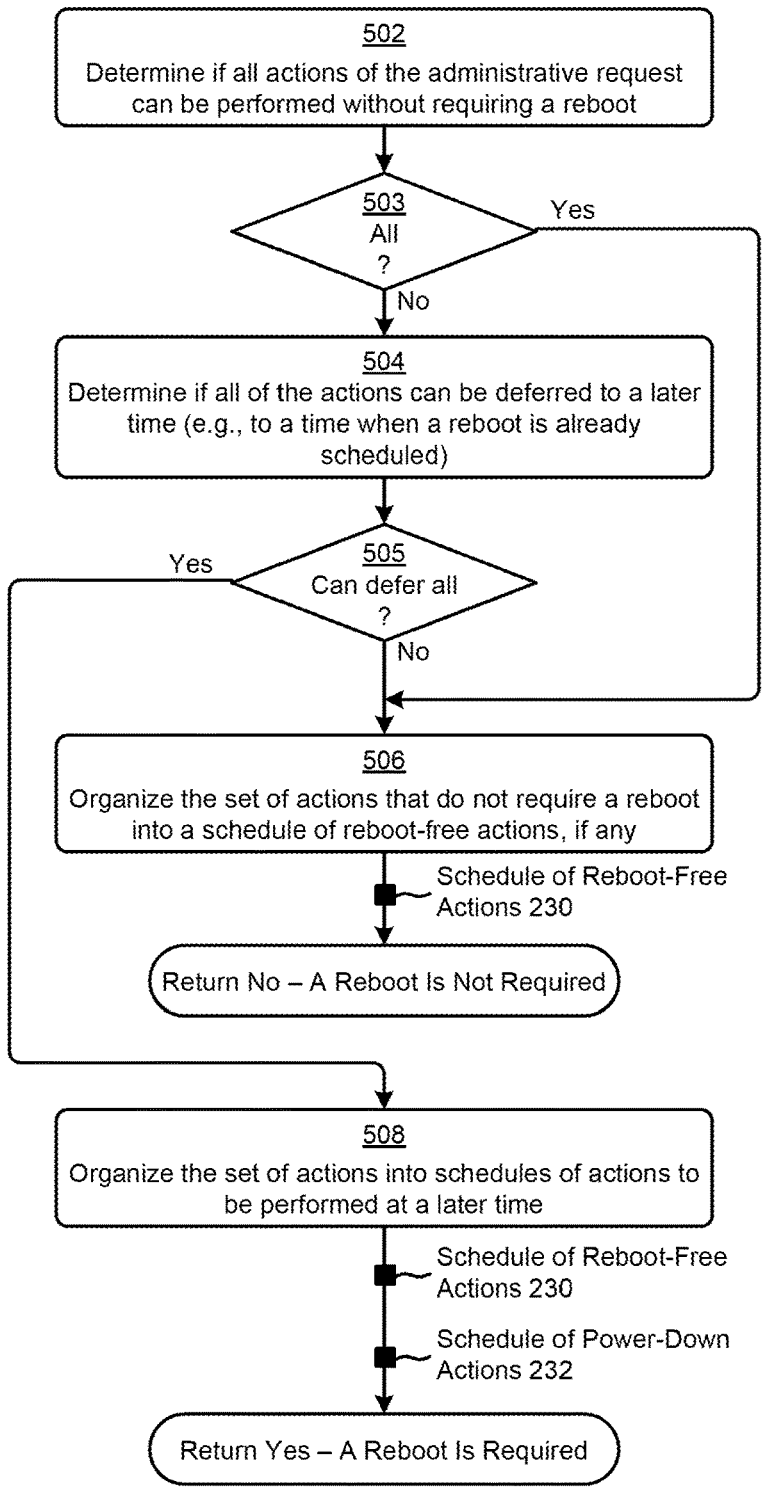
FIG. 5 is a flowchart depicting a reboot requirement routine, according to one embodiment.

FIG. 5 is a flowchart depicting a reboot requirement routine 500. As an option, one or more variations of the reboot requirement routine 500 or any aspect thereof may be implemented in the context of the architecture and functionality of the embodiments described herein. The reboot requirement routine 500 or any aspect thereof may be implemented in any environment.

Referring again to FIG. 2A and FIG. 2B, at decision 209, either the "Yes" branch or the "No" branch is taken based on several logical determinations. Specifically, and as shown by step 502 and decision 503, if all actions of the administrative request are actions that do not require a reboot, then at step 506, a schedule of reboot-free actions 230 can be formed. As such, the reboot assessment returned by the flow of FIG. 5 is "No", and thus the "No" branch of decision 209 is taken.

In an alternative situation, it might be that not all actions of the administrative request are actions that do not require a reboot (i.e., at least some of the actions of the administrative request are actions that do require a reboot) and, as such, at step 504 an inquiry is made to determine if all of the actions can be deferred. If so, the "Yes" branch of decision 505 is taken and, at step 508, the administrative actions are organized into schedules of actions that can be performed at a later time. Specifically, and as shown, a schedule of actions that do not require a reboot is formed as is a schedule of actions that do require a reboot and/or power-down; i.e., the routine returns "Yes". This "Yes" determination carries the semantic that at least one administrative action requires that the node be rebooted to complete the administrative action.

Figure 6:
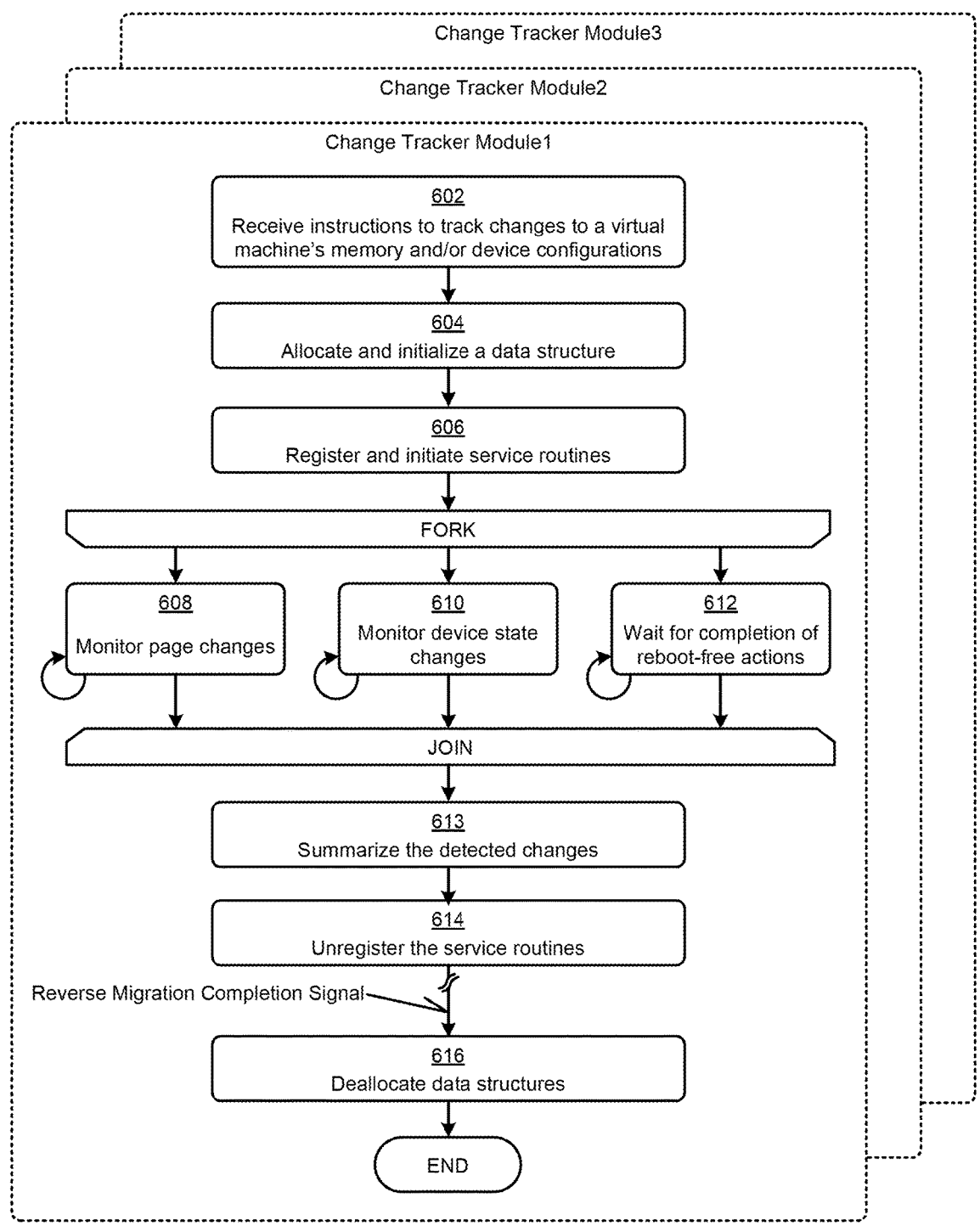
FIG. 6 is a flowchart depicting change tracking techniques, according to one embodiment.

FIG. 6 is a flowchart depicting change tracking techniques 600. As an option, one or more variations of the change tracking techniques or any aspect thereof may be implemented in the context of the architecture and functionality of the embodiments described herein. The reboot requirement routine or any aspect thereof may be implemented in any environment.

Referring again to FIG. 1B, specifically the occurrences of change tracker module1, change tracker module2, and change tracker module3, these change trackers are present at the destination node (e.g., the shown Node2 of FIG. 1B). In various embodiments, one or two or three or more change trackers are operational so as to detect and capture changes made to (1) memory pages, (2) device states, and/or other changes made in or to the forward-migrated VM. The changes are then communicated in the reverse migration actions.

Change trackers such as change tracker module 1, change tracker module2, and change tracker module3 can operate as multiple concurrently-running instances of the same change tracker, or the change trackers can operate in cooperation with each other. The change trackers can be situated in a hypervisor, and/or in the host operating system, and/or in the drivers or ancillary control processors of any devices. Change trackers can implement interrupt service routines (e.g., in a host operating system, possibly in conjunction with a device driver) and/or change trackers can implement virtual interrupt service routines (e.g., in a hypervisor).

In the embodiment shown involving change tracker module2 and change tracker module3, the change trackers are deployed as separate instances of the same code, which code is configured to integrate with a hypervisor, and/or a host operating system, and/or a device (e.g., a network interface device) and/or device driver. Any of these instances are able to receive instructions to initiate tracking of changes made to a running VM (step 602). Upon receipt and processing of such an instruction, the instances allocate and initialize one or more data structures. Such data structures may be allocated on the basis of their context. For example, if an instance of a tracker module is situated in a hypervisor, the allocation might come from virtual memory outside of the virtual memory space of the subject VM. As another example, if an instance of a tracker module is situated in the host operating system, the allocation might come from real physical memory outside of the real physical memory space that correlates to the virtual memory space of the subject VM. As yet another example, if an instance of a tracker module is situated in a device driver or in a device itself, the allocation might come from HIMEM that is reserved memory in the footprint of the operating system, or the allocation might come from memory that is dedicated to, and accessible only from within, the device.

At step 604, service routines that correspond to the context are registered (step 606). The service routines operate in parallel within a FORK/JOIN block. Specifically, and as shown, a first service routine 608 serves to continuously monitor page changes, a second service routine 610 serves to continuously monitor device state changes, and third service routine 612 serves to continuously check for a signal that indicates completion of the reboot-free actions. When such a signal is received, then service routine 608 and service routine 610 are signaled to drop into the JOIN.

At step 613, changes that had been detected during processing within the FORK JOIN block are summarized and stored into data structures that are used by the source node to apply the changes to the preserved memory of the source node. Strictly as an example, the data structures may include the then-current contents of a set of virtual memory pages that had been detected as changed. As another example, the then-current contents of a particular virtual memory page can be compared to the contents of the same memory page as was received at the destination node in the forward migration. The differences can then be codified into a data structure to indicate the exact change or changes within a virtual memory page. In some cases, the exact change or changes can be described as a numeric offset (e.g., a byte or word offset) within a subject memory page, followed by a numeric length (e.g., a byte count or a word count) that serves to bound the beginning and end of the range of changes, followed by the changed data in an amount that corresponds to the specified range.

The service routines are then unregistered (step 614). At some later moment in time (e.g., after the reverse migration tasks have completed), the data structures of the change trackers can be deallocated (step 616).

Additional Embodiments of the Disclosure

Additional Practical Application Examples

Figure 7:
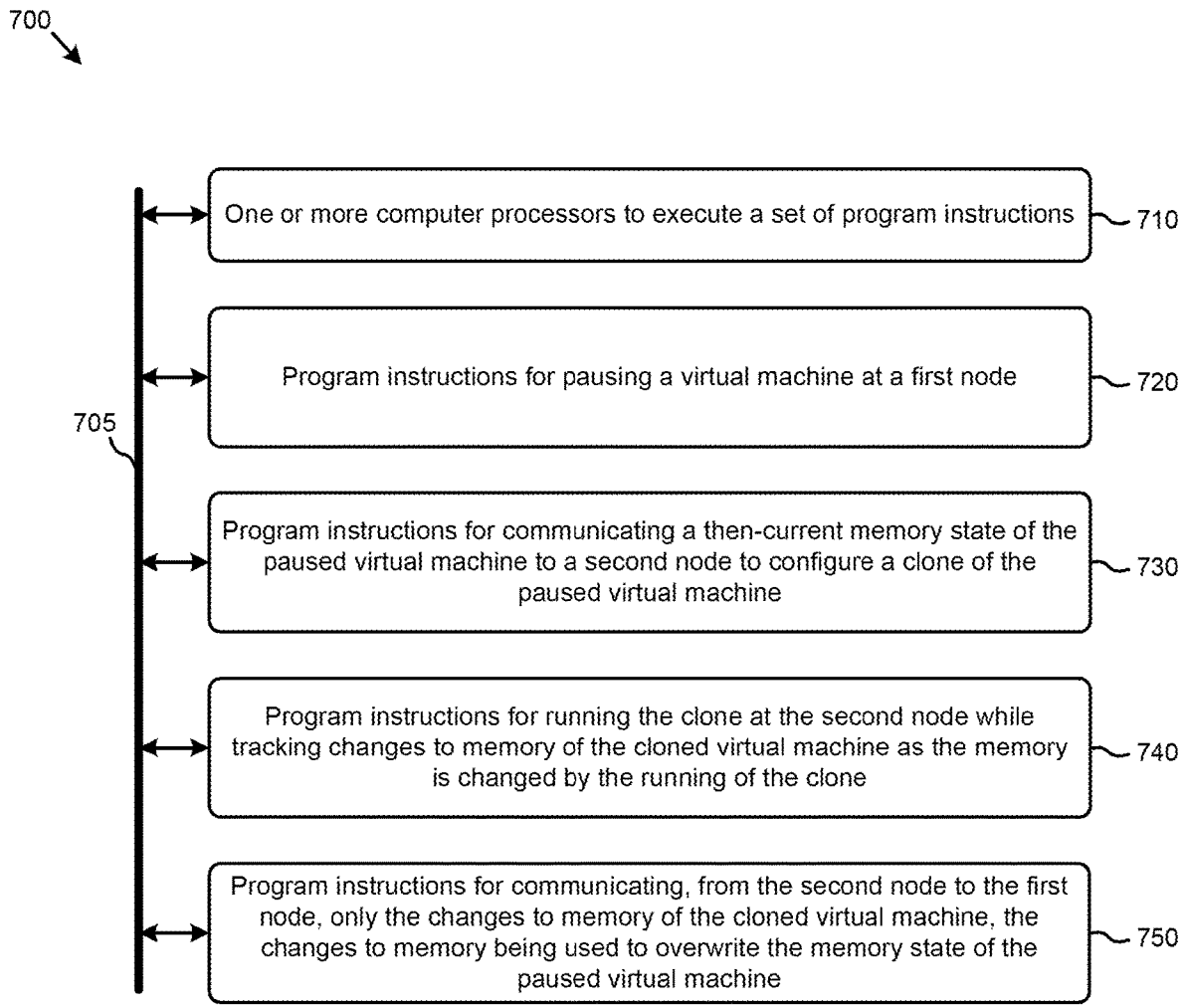
FIG. 7 depicts a system as an arrangement of computing modules that are interconnected so as to operate cooperatively to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually or combined, serve to form improved technological processes that are practiced during rolling upgrades of a multi-node cluster. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with any other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising one or more computer processors to execute a set of program code instructions (module 710) and modules for accessing memory to hold program code instructions to perform: pausing a virtual machine at a first node (module 720); communicating a then-current memory state of the paused virtual machine to a second node to configure a clone of the paused virtual machine (module 730); running the clone at the second node while tracking changes to memory of the cloned virtual machine as the memory is changed by the running of the clone (module 740); and communicating, from the second node to the first node, only the changes to memory of the cloned virtual machine, the changes to memory being used to overwrite the memory state of the paused virtual machine (module 750).

Variations of the foregoing may include more or fewer of the shown modules. Certain variations may perform more or fewer (or different) steps and/or certain variations may use data elements in more, or in fewer, or in different operations.

Any one or more of the aforementioned operations, or any portion of any one or more of the aforementioned operations can be performed in whole or in part by a hypervisor or a virtualized controller. Examples of such a virtualized controller as well as configurations in which such a virtualized controller can execute are shown and discussed as pertains to FIG. 8A, FIG. 8B, and FIG. 8C.

Figure 8A:
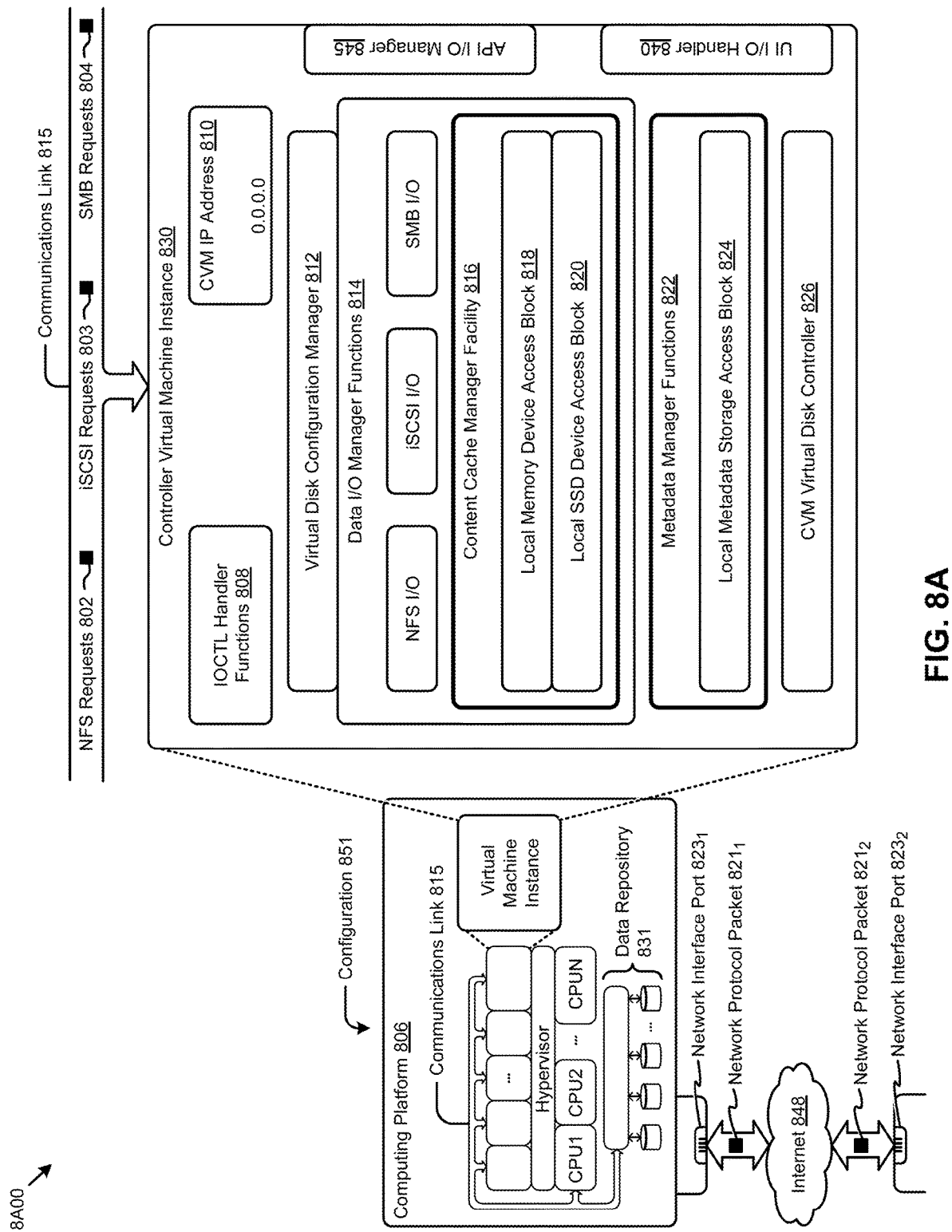
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to situation-aware virtual machine migration. In some embodiments, a module may include one or more state machines and/or combinational logic used to implement or facilitate the operational and/or performance characteristics pertaining to situation-aware virtual machine migration.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of situation-aware virtual machine migration). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to situation-aware virtual machine migration, and/or for improving the way data is manipulated when performing computerized operations pertaining to recognizing when a particular upgrade of a node does not require a reboot of that node such that the memory of the upgraded node can be advantageously managed during an upgrade cycle.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
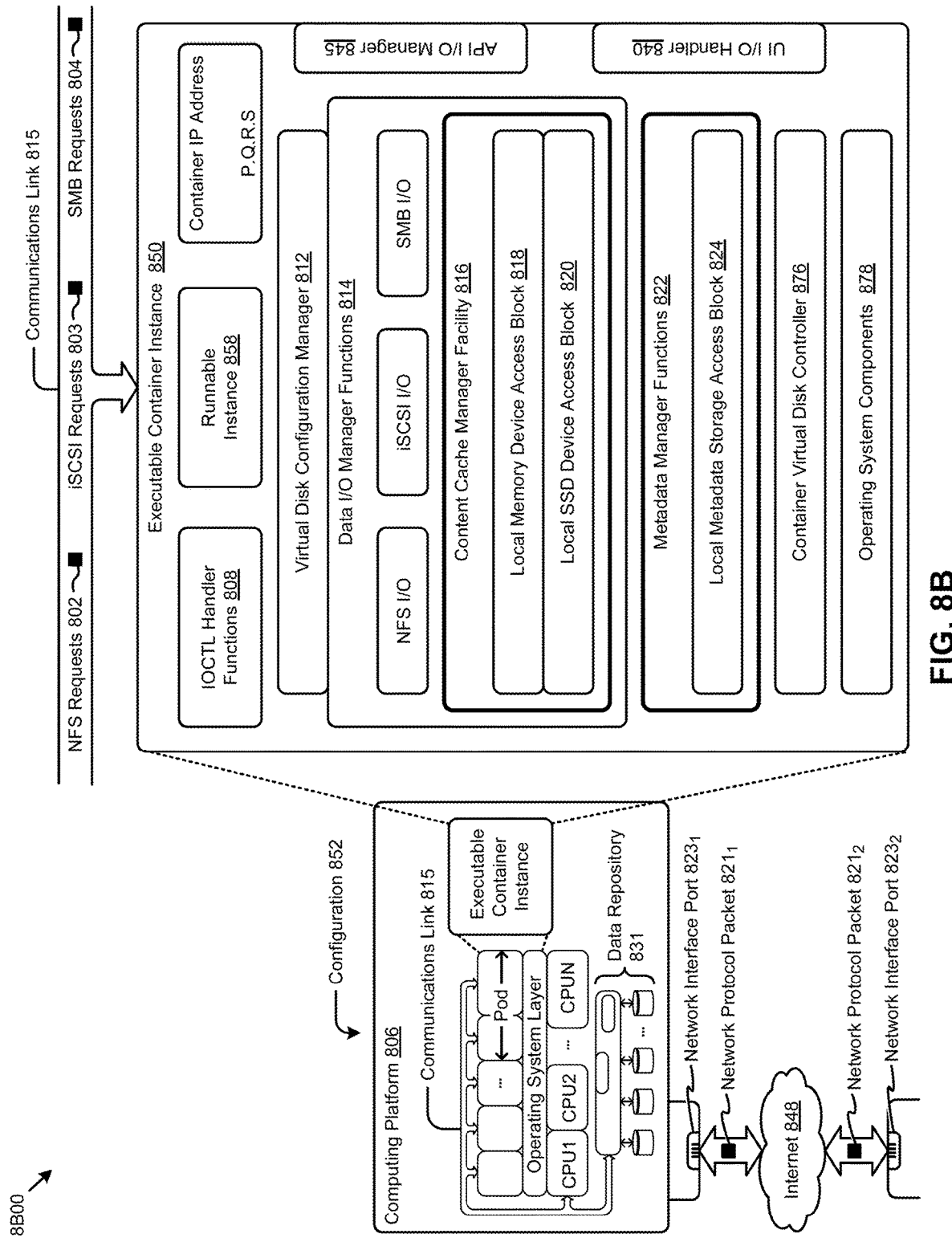

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls -a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
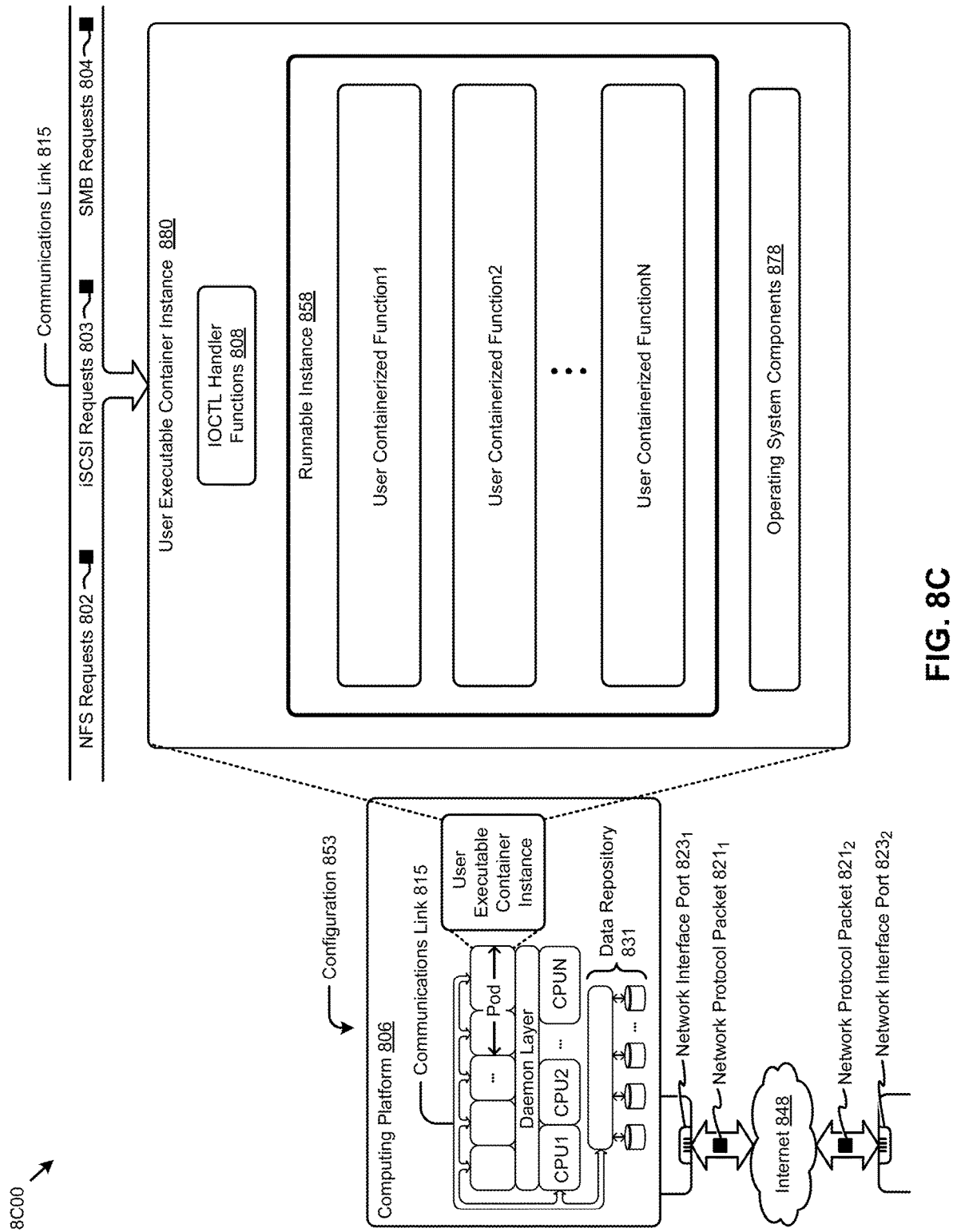

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when executed by a processor causes a set of acts comprising:

pausing a virtual machine at a first node;
transmitting a memory state of the paused virtual machine to a second node, wherein the memory state is used to create a clone of the virtual machine at the second node, the clone of the virtual machine executes at the second node, and changes to memory of the clone of the virtual machine are tracked at the second node during execution of the clone of the virtual machine;
receiving, at the first node and from the second node, the changes to the memory of the clone of the virtual machine; and
applying the changes to the memory a preserved memory state of the same paused virtual machine at the first node.

2. The non-transitory computer readable medium of claim 1, wherein the set of acts further comprise resuming the paused virtual machine at the first node.

3. The non-transitory computer readable medium of claim 1, wherein the set of acts further comprise tracking changes to a device state of the clone of the virtual machine as a device is changed by the execution of the clone of the virtual machine.

4. The non-transitory computer readable medium of claim 1, wherein the set of acts further comprise communicating, from the second node to the first node, changes to a device state of the clone of the virtual machine after the device state was changed by the execution of the clone of the virtual machine.

5. The non-transitory computer readable medium of claim 1, wherein the set of acts further comprise receiving an administrative action at the first node.

6. The non-transitory computer readable medium of claim 5, wherein the set of acts further comprise classifying the administrative action as an action that can be performed without a reboot of the first node.

7. The non-transitory computer readable medium of claim 5, wherein the set of acts further comprise processing at least a portion of the administrative action on the first node while the clone of the virtual machine is executing at the second node.

8. The non-transitory computer readable medium of claim 1, wherein transmitting of the memory state of the paused virtual machine to the second node to configure a clone of the paused virtual machine is performed at least in part before the pausing of the virtual machine at the first node.

9. A method for situation-aware virtual machine migration, the method comprising:
pausing a virtual machine at a first node;
transmitting a memory state of the paused virtual machine to a second node, wherein the memory state is used to create a clone of the virtual machine at the second node, the clone of the virtual machine executes at the second node, and changes to memory of the clone of the virtual machine are tracked at the second node during execution of the clone of the virtual machine;
receiving, at the first node and from the second node, the changes to the memory of the clone of the virtual machine; and
applying the changes to the memory to a preserved memory state of the same paused virtual machine at the first node.

10. The method of claim 9, further comprising resuming the paused virtual machine at the first node.

11. The method of claim 9, further comprising tracking changes to a device state of the clone of the virtual machine as a device is changed by the execution of the clone of the virtual machine.

12. The method of claim 9, further comprising communicating, from the second node to the first node, changes to a device state of the clone of the virtual machine after the device state was changed by the execution of the clone of the virtual machine.

13. The method of claim 9, further comprising receiving an administrative action at the first node.

14. The method of claim 13, further comprising classifying the administrative action as an action that can be performed without a reboot of the first node.

15. The method of claim 13, further comprising processing at least a portion of the administrative action on the first node while the clone of the virtual machine is executing at the second node.

16. The method of claim 9, wherein transmitting of the memory state of the paused virtual machine to the second node to configure a clone of the paused virtual machine is performed at least in part before the pausing of the virtual machine at the first node.

17. A system comprising:
a storage medium having stored thereon a sequence of instructions; and
a processor that executes the sequence of instructions to cause a set of acts comprising,
pausing a virtual machine at a first node;
transmitting a memory state of the paused virtual machine to a second node, wherein the memory state is used to create a clone of the virtual machine at the second node, the clone of the virtual machine executes at the second node, and changes to memory of the clone of the virtual machine are tracked at the second node during execution of the clone of the virtual machine;
receiving, at the first node and from the second node, the changes to the memory of the clone of the virtual machine; and
applying the changes to the memory to a preserved memory state of the same paused virtual machine at the first node.

18. The system of claim 17, wherein the set of acts further comprise resuming the paused virtual machine at the first node.

19. The system of claim 17, wherein the set of acts further comprise tracking changes to a device state of the clone of the virtual machine as a device is changed by the execution of the clone of the virtual machine.

20. The system of claim 17, wherein the set of acts further comprise communicating, from the second node to the first node, changes to a device state of the clone of the virtual machine after the device state was changed by the execution of the clone of the virtual machine.

21. The system of claim 17, wherein the set of acts further comprise receiving an administrative action at the first node.

22. The system of claim 21, wherein the set of acts further comprise classifying the administrative action as an action that can be performed without a reboot of the first node.

23. The system of claim 21, wherein the set of acts further comprise processing at least a portion of the administrative action on the first node while the clone of the virtual machine is executing at the second node.

24. The system of claim 17, wherein transmitting of the memory state of the paused virtual machine to the second node to configure a clone of the paused virtual machine is performed at least in part before the pausing of the virtual machine at the first node.

* * * * *